Patented May 22, 1951

2,553,914

UNITED STATES PATENT OFFICE 2,553,914

SUBSTITUTED DIPHENYLAMINE 2-MONO-CARBOXYLIC ACIDS AND THE PRODUCTION THEREOF

Alan August Goldberg, Hampstead, England, assignor to Ward, Blenkinsop & Company Limited, London, England, a British company No Drawing. Application March 21, 1949, Serial No. 82,707. In Great Britain March 22, 1948

4 Claims. (Cl. 260—519)

This invention relates to substituted phenyl anthranilic acids having the general formula

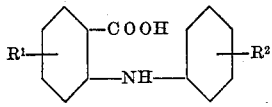

in which $R^1$ is selected from the group consisting of hydrogen and halogen and $R^2$ is selected from the group consisting of phenyl, phenoxy, para-aminophenyl, para-halogenophenyl, para-halogeno-phenoxy and para-halogenophenylamino. The invention includes the acids themselves and a method of producing them.

The method of producing the acids in accordance with the invention comprises heating the metal salt of a 2-halogenobenzoic acid containing the substituent $R^1$ with an aniline containing the substituent $R^2$ in the presence of an acid acceptor and a source of copper and in an inert organic diluent in which at least one of the reactants is at least slightly soluble.

The 2-halogenbenzoic acid salt employed may have the substituent $R^1$ present in any position but, since it has been found that the substituted phenylanthranilic acids having a halogen atom in the 4- or 5-position possess more pronounced tuberculostatic properties, it is preferred to use the 2.4- and 2.5-dihalogenobenzoic acids. There may be employed alkali or alkaline earth metal salts of ortho-, chloro- and bromobenzoic acids, 2.3-, 2.4-, 2.5- and 2.6-dichlorobenzoic acids, 2.4-dibromobenzoic acid or 2-chloro-5-bromo-benzoic acid. Preferably the sodium or potassium salts are employed.

The aniline employed may contain the substituent $R^2$ in any position but it is preferred that it be present in the para-position with respect to the amino group. Examples of substituted anilines that may be used are 2- and 4-aminodiphenyls, 4-amino-4'-chlorodiphenyl, 4-aminodiphenyl ether, 4-amino-4'-chlorodiphenyl ether, 4-amino-4'-chlorodiphenylamine and benzidine. Of special interest are those compounds in which the group $R^2$ is a para-chlorophenylamino, para-chlorophenyl, phenoxy or para-chlorophenoxy group as the compounds containing these residues appear to show pronounced tuberculostatic properties.

The acid acceptor employed is most conveniently an alkali metal carbonate, potassium carbonate being especially useful.

The source of copper may conveniently be either powdered metallic copper, a powdered copper alloy such as powdered copper bronze or a copper salt such as copper iodide. The amount is generally quite small, 1-2% based on the weight of the reactants being sufficient.

Any organic diluent may be employed so long as the 2-halogenobenzoic acid or the metal salt thereof, or alternatively, the substituted aniline employed is at least slightly soluble therein. A suitable class of diluents are the normally liquid akanols and cycloalkanols, especially those containing from four to seven carbon atoms in the molecule. Examples of such diluents are propyl, iso-propyl, butyl and amyl alcohols, used separately or in admixture, cyclohexanol and methylcyclohexanol. These diluents, may but need not necessarily, be anhydrous. Other suitable diluents include dichlorobenzene, nitrobenzene and the ethylene glycol and polyethylene glycol monoalkyl ethers such as ethylene glycol monoethyl ether, ethylene glycol monobutyl ether and diethylene glycol monoethyl ether.

In the preferred procedure employing an alkali metal carbonate as acid acceptor, at least sufficient of this material should be present to neutralise the 2-halogenobenzoic acid and to react with the whole of the hydrogen halide eliminated by the condensation reaction. It is preferred to carry out the neutralisation of the 2-halogenobenzoic acid in such a way as to produce the alkali metal salt thereof in a voluminous form. For this purpose the ortho-halogenobenzoic acid, in solution and/or suspension in the diluent is treated with the alkali metal carbonate, such as potassium carbonate, which is added portionwise with rapid stirring and heating. The mass may then be somewhat cooled, the substituted aniline and the source of copper added and the mixture heated with stirring under reflux. Ebullition of the diluent and the stirring together ensure intimate admixture of the reactants. The product consists of the corresponding alkali metal salt of the diphenylamine 2-carboxylic acid. To isolate this the diluent employed may first be removed in a suitable manner, for example by steam distillation, the aqueous residue treated with charcoal and filtered and then, while still hot, acidified with a mineral acid such as hydrochloric acid. Normally the substituted diphenylamine 2-carboxylic acid is precipitated and is ready for purification. This may be effected by recrystallising from a suitable solvent. Alternatively it may be reconverted to the potassium salt and this recrystallised or salted out from a concentrated aqueous solution thereof, followed by reconversion of the purified salt to the free acid. A salt of the diphenylamine 2-carboxylic acid may be directly salted out from the filtered residue from steam distillation.

The reaction involves elimination of hydrogen halide between the 2-halogen substituent of the 2-halogenobenzoic acid and a free amino group of the substituted aniline. Halogen substituents in other positions in the 2-halogenbenzoic acid are substantially unaffected and are present as the corresponding substituent in the phenyl nucleus of the diphenylamine 2-carboxylic acid which carries the carboxyl group.

The disubstituted dephenylamine 2-carboxylic acids described herein possess valuable pharmacological properties, especially tuberculostatic properties and are also intermediates for the manufacture of other substances of pharmacological value.

The following examples illustrate the manner in which the invention may be carried into effect. All the parts are parts by weight.

Example 1

78 parts of ortho-chlorobenzoic acid, 90 parts of para-xenylamine, 86 parts of potassium carbonate and 1 part of copper powder are heated together with 350 parts of amyl alcohol for 3 hours under reflux. The amyl alcohol is removed by distillation in steam and the residual aqueous solution filtered with charcoal. Acidification of the warm solution to a pH value of 4.0 effects precipitation of 90 parts of the 4'-phenyl-diphenylamine-2-carboxylic acid. On recrystallisation from ethyl alcohol this is obtained in pale fawn needles M. P. 234° C.

Example 2

100 parts of 2:4-dichlorobenzoic acid, 90 parts of paraxenylamine, 86 parts of potassium carbonate, a trace of copper powder and 400 parts of amyl alcohol are heated for 4 hours under reflux. On further treatment as in Example 1 there are obtained 110 parts of 5-chloro-4'-phenyldiphenylamine-2-carboxylic acid.

Example 3

47 parts of 2:4-dichlorobenzoic acid, 43 parts of potassium carbonate and 1 part of copper powder are stirred with 400 parts of amyl alcohol for one-half hour. 56 parts of paraaminodiphenyl ether are added and the mixture refluxed for 3 hours. After removal of the amyl alcohol in a current of steam the residual solution is filtered and the filtered solution is acidified with hydrochloric acid in order to precipitate the 5-chloro-4'-phenoxydiphenylamine-2-carboxylic acid. On recrystallisation from ethyl alcohol this is obtained in yellow needles M. P. 190° C. Yield 30 parts.

Example 4

By using 40 parts of ortho-chlorobenzoic acid in place of the 2:4-dichlorobenzoic acid described in Example 3 there is in like manner obtained 38 parts of 4'-phenoxydiphenylamine-2-carboxylic acid M. P. 198° C.

Example 5

By using the same quantity of 2:5-dichlorobenzoic acid instead of the 2:4-dichlorobenzoic acid used in Example 3 there is in like manner obtained 4-chloro-4'-phenoxydiphenylamine-2-carboxylic acid.

Example 6

78 parts of ortho-chlorobenzoic acid, 112 parts of 4-chloro-4'-aminodiphenyl, 86 parts of potassium carbonate, 1 part of copper powder and 500 parts of amyl alcohol are heated together under reflux with stirring for 4 hours. After removal of the solvent in a current of steam the residual solution, after filtration, is acidified with hydrochloric acid whereupon the 4'-(para-chlorophenyl)-diphenylamine-2-carboxylic acid is precipitated. Recrystallisation from dilute dioxane gives the pure compound in yellow needles M. P. 230° C.

Example 7

By using 96 parts of 2:3-dichlorobenzoic acid in place of the 78 parts of ortho-chlorobenzoic acid in Example 6 there is obtained in the same manner 6-chloro - 4' - (para - chlorophenyl) - diphenylamine-2-carboxylic acid.

Example 8

78 parts of ortho-chlorobenzoic acid, 102 parts of benzidine, 125 parts of potassium carbonate, 1 part of copper powder and 500 parts of amyl alcohol are heated under reflux, with stirring, for 3 hours. After removal of the amyl alcohol in a current of steam the residual aqueous solution is filtered with charcoal, evaporated to small volume and a concentrated solution of 50 parts of potassium chloride added. On standing for 24 hours the potassium salt of 4'-(para-aminophenyl)-diphenylamine - 2 - carboxylic acid separates as a mass of small needles. These are collected, redissolved in boiling water and the solution adjusted to pH 4.0 with hydrochloric acid in order to precipitate the free acid. Yield 50 parts M. P. 246° C. with decomposition.

Example 9

By using 94 parts of 2:6-dichlorobenzoic acid instead of the 78 parts of ortho-chlorobenzoic acid described in Example 8 and carrying out the same procedure, there is obtained 75 parts of 3-chloro - 4' - (para - aminophenyl) - diphenylamine-2-carboxylic acid.

Example 10

78 parts of ortho-chlorobenzoic acid, 86 parts of potassium carbonate, 90 parts of ortho-xenylamine, 1 part of copper powder and 40 parts of butyl alcohol are refluxed together for 8 hours. After treatment as described in Example 1 there is obtained 2' - phenyl - diphenylamine - 2 - carboxylic acid M. P. 148° C.

Example 11

By using 92 parts of 2:5-dichlorobenzoic acid in place of the ortho-chlorobenzoic acid in Example 10 there is obtained 4-chloro-2'-phenyl-diphenylamine-2-carboxylic acid.

Example 12

By using 96 parts of 2:4-dichlorobenzoic acid in place of the 78 parts of ortho-chlorobenzoic acid in Example 6 there is obtained 100 parts of 5 - chloro - 4' - (para - chlorophenyl) - diphenylamine-2-carboxylic acid.

Example 13

191 parts of 2:4-dichlorobenzoic acid, 152 parts of potassium carbonate and 2 parts of copper powder are stirred together in 1800 parts of amyl alcohol for 45 minutes during which time approximately 300 parts of the amyl alcohol are distilled off. The resulting suspension containing potassium 2:4-dichlorobenzoate is cooled, 230 parts of 4-amino-4'-chlorodiphenyl ether added and the resulting mixture then stirred under reflux for 3 hours. The amyl alcohol is distilled from the reaction product in steam and the residual liquor is filtered with charcoal. Upon acidification of the filtrate with hydrochloric acid 5 - chloro - 4' - (para - chlorophenoxy) - diphenylamine-2-carboxylic acid is precipitated, the product is collected and can be purified by dissolution in dilute aqueous potassium carbonate and reprecipitation therefrom with hydrochloric acid.

Example 14

By substituting 229 parts of 4-amino-4'-chlorodiphenylamine for the 230 parts of 4-amino-4'-chlorodiphenyl ether in Example 13 there is obtained 5 - chloro - 4' - para - chlorophenylamino) - diphenylamine - 2 - carboxylic acid which may be purified in the same way.

I claim:

1. 5 - chloro - 4' - phenoxy diphenylamine - 2-carboxylic acid.
2. 5 - chloro - 4' - (para - chlorophenoxy) - diphenylamine-2-carboxylic acid.
3. As a new product, a substituted diphenylamine carboxylic acid corresponding to the formula

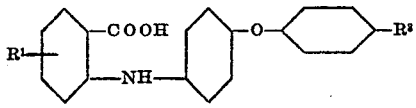

wherein each of $R^1$ and $R^3$ represents a member selected from the group consisting of hydrogen and chlorine, $R^1$ being in one of the positions 4 and 5, at least one of $R^1$ and $R^3$ representing chlorine.

4. 4 - chloro - 4' - phenoxydiphenylamino - 2 - carboxylic acid.

ALAN AUGUST GOLDBERG.

REFERENCES CITED

The following references are of record in the file of this patent:

Ullman: Chem. Abstracts, vol. 2, p. 88 (1908).
Kalb: Chem. Abstracts, vol. 4, pp. 2929–2930 (1910).
Weiss et al.: Chem. Abstracts, vol. 23, p. 1131 (1929).
Giral et al.: Chem. Abstracts, vol. 40, col. 7181 (1946).
Singh et al.: Chem. Abstracts, vol. 42, col. 1279 (1948).
Goldberg et al.: Chem. Abstracts, vol. 42, col. 5079 (1948).